H. B. TAYLOR.
ELECTRICAL MEASURING INSTRUMENT.
APPLICATION FILED AUG. 11, 1913.
1,234,964.
Patented July 31, 1917.
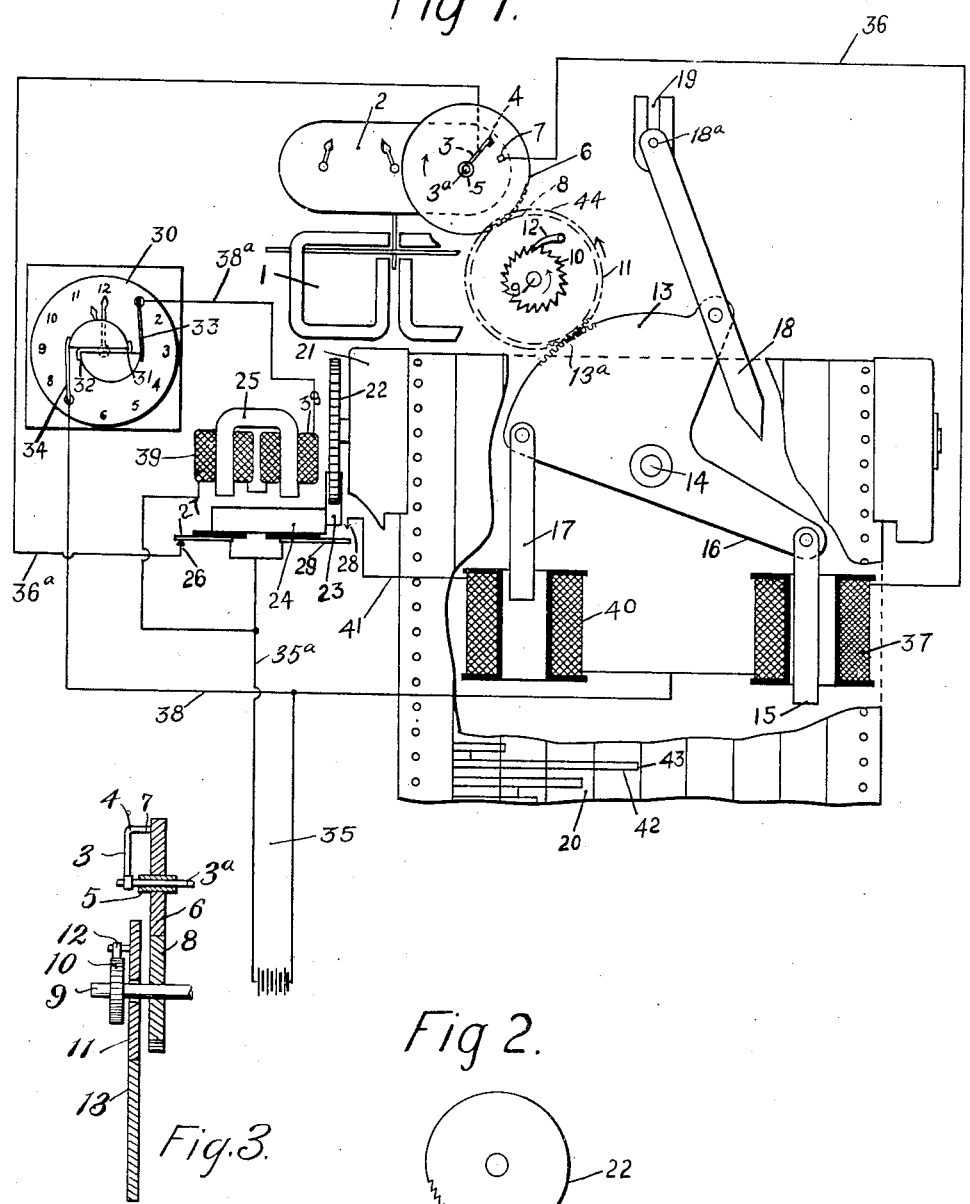
WITNESSES:
INVENTOR
Harold B. Taylor
BY
Wisley E. Carr
ATTORNEY

UNITED STATES PATENT OFFICE.

HAROLD B. TAYLOR, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,234,964.          Specification of Letters Patent.      Patented July 31, 1917.

Application filed August 11, 1913. Serial No. 784,058.

*To all whom it may concern:*

Be it known that I, HAROLD B. TAYLOR, a citizen of the United States, and a resident of Wilkinsburg, in the county of Allegheny and State of Pennsylvania, have invented a new and useful Improvement in Electrical Measuring Instruments, of which the following is a specification.

My invention relates to measuring instruments, and particularly to maximum-demand meters.

The object of my invention is to provide a graphic maximum-demand meter that will give clear and accurate records on a continuous record sheet.

Heretofore, recording maximum-demand meters have been used to some extent to meter electrical energy on a maximum-demand basis and especially when such maximum-demand is to be recorded without reference to the time of day at which it occurs. By my invention, the maximum demand is recorded on a record sheet together with the time at which it occurs. My instrument records the amounts of power consumed during certain predetermined intervals of time throughout the day, and the record provided is of such shape as to make it easily readable, in that, each record applying to one time interval is represented by a straight line instead of by a printed record or by irregular peaked curves.

In the accompanying drawing, Figure 1 is a diagrammatic view, partially in section, of a maximum-demand meter embodying my invention, Fig. 2 is a side elevational view of the notching-up member used in my invention, and Fig. 3 is a side view, partially in section and partially in elevation, of the contact mechanism embodied in my invention.

My invention comprises an integrating wattmeter 1, a contact-making clock 30, a gearing device 44, a notching-up electromagnet 25, a marking device or pen 18, actuating electromagnets 37 and 40, and a record strip or sheet 20.

The wattmeter 1 is provided with an integrating mechanism 2, one pointer 3 of which has a contact member 4 thereon. The pointer 3 is mounted on a shaft $3^a$ that is provided with a loosely mounted insulating sleeve 5. A gear wheel 6 is mounted on the sleeve 5 and is provided with a contact member 7 that is adapted to be engaged by the contact member 4. A ratchet wheel 10 and a gear wheel 8 are mounted on a shaft 9, the latter meshing with the gear wheel 6 on the sleeve 5. Loosely mounted on the shaft 9 is a gear wheel 11 that has a pawl 12 which engages the ratchet wheel 10. The loosely mounted gear wheel 11 engages the teeth $13^a$ on the periphery of an accurately balanced oscillating member 13 that is pivotally mounted on a shaft 14.

The oscillating member 13 has an arm 16 to which is connected the movable core member 15 of the electromagnet 37. To the member 13 is also attached the movable core member 17 of the electromagnet 14 and the pen or marking device 18. The upper end of the pen 18 is provided with a pin $18^a$ that is disposed in a slot in a member 19 for the purpose of providing a straight-line motion for the lower end of the pen.

The paper 20 is unwound from a roller 21 by the notching-up action of the electromagnet 25 acting through an armature 24, an actuating pawl 23 and a ratchet wheel 22 mounted on the shaft of the roller 21. The electromagnet 25 is provided with windings 39 and two contact members 27 and 29 that are adapted to engage stationary contact members 26 and 28, respectively.

The clock 30 comprises two movable contact members 31 and 32 that are electrically connected to each other and two stationary contact members 33 and 34 that are adapted to engage the contact members 31 and 32, respectively, at predetermined times.

One terminal of a source of eletromotive force 35 is connected, by a conductor $35^a$, to the contact members 27, 29 and one terminal of the electomagnet winding 39, and the other terminal is connected, by a conductor 38, to the contact member 34 and one terminal of each of the electromagnets 37 and 40. The contact member 33 is connected, by a conductor $38^a$, to the other terminal of the electromagnet winding 39. The remaining terminal of the electromagnet 37 is connected, by a conductor 36, to the contact member 7, and the other terminal of the electromagnet winding 40 is connected, by a conductor 41, to the contact member 28. A conductor $36^a$ connects the contact member 36 to the contact member 4.

When current is supplied to the wattmeter 1, the armature thereof rotates to actuate the integrating mechanism 2. The pointer 3 thus moves in the direction as indicated by the arrow in accordance with the energy being measured, and the contact member 4 engages the contact member 7 to thus energize the electromagnet 37 for an instant. When the contact members 4 and 7 are engaged, the electromagnet 37 is energized to move its movable core member 15 downwardly. However, the movable core member 15 moves downwardly a relatively short distance, because a slight movement of the member 13 causes the gear wheel 5 to turn a predetermined distance in the same direction as the arm 3 moves to effect disengagement of the contact members 4 and 7. That is, a relatively small movement of the member 13 causes the contact member 7 to be actuated relatively fast for a predetermined distance through the gear wheel 11, the ratchet wheel 10, the shaft 9, the gear wheel 8 and the gear wheel 6. Thus, if the armature 24 of the notching-up device 25 is in the position indicated, and the energy to be measured is relatively large or increasing, the pen 18 will be advanced by successive steps to produce a straight line on the paper 20. The member 13, being accurately balanced, will remain in any position unless moved by the successive instantaneous energizations of the electromagnet 37 or the periodic energizations of the resetting electromagnet 40. The movement of the pen 18 continues for a predetermined time, according to the interval of demand desired, and may be changed by changing the position of the contact members on the clock 30. Thus, a line 42 is described on the paper 20 that indicates the value of energy consumed or measured during a predetermined interval of time, as a second, minute or hour. After the expiration of the time interval, the contact members 31 and 33 and 32 and 34 are engaged to energize the electromagnet 25, the armature 24 of which is moved upwardly to advance the paper 20 a distance represented by the line 43 or the distance between two teeth on the ratchet wheel 22. After the paper has been advanced a predetermined distance, the contact members 28 and 29 are engaged to energize the electromagnet 40. When the electromagnet 40 is energized, the movable core member 17 moves downwardly to actuate the member 13 which resets the pen 18. This action will not disturb the integrating mechanism or the mechanism 44 since the gear wheel 11 is loosely mounted on the shaft 9, and the pawl rides over the teeth of the ratchet wheel 10.

The contact members 26 and 27 are so provided that when the electromagnet 40 is energized the electromagnet 37 cannot be, thus insuring a positive reset of the pen 18 at regular intervals. It is assumed that the contact members 31 and 33 and 32 and 34, respectively, remain in engagement sufficient time for the pen 18 to reset, then they become disengaged to permit the armature 24 to move downwardly and the contact members 26 and 27 to become reëngaged. Thus, the engagement of the contact members 4 and 7 will again cause the pen to be actuated.

The record produced is thus a series of straight lines drawn by a pen, the length of the line being proportional to the watthour demand. In practice, the line need not be drawn in full. Any means whereby the length of the line is definitely recorded, as for instance, by a dot or punch mark at the extreme limit of travel of the recording element would come within the scope of my invention.

While I have described my invention with respect to its construction and theory of operating, I do not limit the same to any particular type of meter or to any particular method of producing the desired record.

I claim as my invention:

1. A recording instrument comprising a meter having a contact member actuated thereby, a timing device, a marking device, electromagnetic means for actuating the marking device, a second contact member actuated by the marking device for coöperating with the first mentioned contact member for controlling the circuit of the said actuating means, a record sheet, and means controlled by the timing device for advancing the record sheet at predetermined intervals of time.

2. In a recording instrument, the combination with a meter having a contact member adapted to be rotated in one direction in accordance with the energy to be measured, of a marking device, means for actuating the marking device, a second contact member actuated by the marking device in one direction only and coöperating with the first mentioned contact member for controlling the said actuating means.

3. In a recording instrument, the combination with a meter having a contact member actuated thereby, of a marking device, electromagnetic means for actuating the marking device in one direction, a second contact member actuated by the marking device and coöperating with the first mentioned contact member for controlling the circuit of the electromagnetic means.

4. A recording instrument comprising a measuring device, a contact member actuated thereby, a marking device, an electromagnet for actuating the marking device in one direction, a second electromagnet for actuating the marking device in the other direction, a second contact member actuated by the first electromagnet and adapted to coöperate with the other contact member for controlling the circuit of the first electromagnet, and time-controlled means for controlling the circuit of the second electromagnet.

5. A recording instrument comprising a measuring device, a contact member actuated thereby, a marking device, an electromagnet for actuating the marking device in one direction, a second electromagnet for actuating the marking device in the other direction, a second contact member actuated by the first electromagnet and adapted to coöperate with the other contact member for controlling the circuit of the first electromagnet, a record sheet, and time-controlled means for advancing the record sheet and for controlling the circuit of the second electromagnet.

6. A recording instrument comprising a measuring device, a contact member actuated thereby, a marking device, an electromagnet for actuating the marking device in one direction, a second electromagnet for actuating the marking device in the other direction, a second contact member actuated by the first electromagnet and adapted to coöperate with the other contact member for controlling the circuit of the first electromagnet, a record sheet, and time-controlled means for advancing the record sheet and for controlling the circuit of the said electromagnets.

7. A recording instrument comprising an energy-measuring device, a recording mechanism, electromagnetic means for actuating the recording mechanism, coöperating contact members actuated by the energy-measuring device and the recording mechanism for controlling the circuit of the electromagnetic actuating means, a record sheet, and means for resetting the recording mechanism after the record sheet has been advanced and for preventing the actuation of the recording mechanism while being reset.

8. A recording instrument comprising a measuring device, a contact member actuated thereby; a marking device, an electromagnet for actuating the marking device, a contact member actuated by the electromagnet and adapted to coöperate with the other contact member for controlling the circuit of the electromagnet and means for periodically resetting the marking device to its initial position periodically without changing the relation of the contact members with respect to each other.

9. In a recording instrument, the combination with a meter having a contact member actuated thereby, of a marking device, means for actuating the marking device, and a contact member adapted to coöperate with the other contact member to control the operation of the marking device, said last-mentioned contact member being adapted to be actuated by the actuating means to disengage the other contact member after each movement of the marking device.

10. In a recording instrument, the combination with an integrating electrical measuring instrument having a contact member actuated thereby, of a recording device, means for actuating the recording device in one direction, a second contact member for coöperating with the other contact member for controlling the actuating means, means interposed between the recording device and the said second contact member for actuating the same, a timing device, a record sheet, means for resetting the recording device, and means controlled by the timing device for advancing the record sheet and for controlling the operation of the resetting means subsequently to the operation of the advancing of the record sheet.

11. In a recording instrument, the combination with a meter having a contact member adapted to rotate in accordance with the energy to be measured, of a marking device, means for actuating the marking device, and a contact member actuated in one direction only for coöperating with the other contact member to control the actuating means.

12. In a recording instrument, the combination with a meter, a record sheet and an independent electromagnetic means for actuating the marking device, of means for periodically advancing the record sheet, means actuated by the meter and the marking device for controlling the circuit of the actuating electromagnet, and electromagnetic means for resetting the marking device to its initial position after each advance of the record sheet.

13. In a recording instrument, the combination with a meter, a record sheet and an independently actuated marking device, of means actuated by the meter and the marking device for controlling the operation of the marking device, means for controlling the periodic advance of the record sheet and for restraining the marking device in one position during the advance of the record sheet, and means for resetting the marking device to its initial position after each advance of the record sheet.

In testimony whereof, I have hereunto subscribed my name this 29th day of July, 1913.

HAROLD B. TAYLOR.

Witnesses:
B. H. SMITH,
B. B. HINES.